Dec. 26, 1961   H. S. BERGESEN ET AL   3,014,598
MOLD POSITIONER FOR CONCRETE-MOLDING PLANT
Filed May 20, 1958   3 Sheets-Sheet 1

INVENTORS:
Howard Bergesen
Innis O'Rourke, Jr.
BY
Karl F. Ross
AGENT.

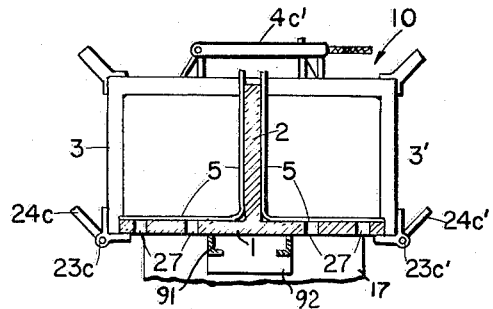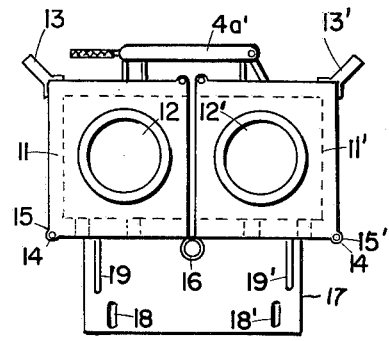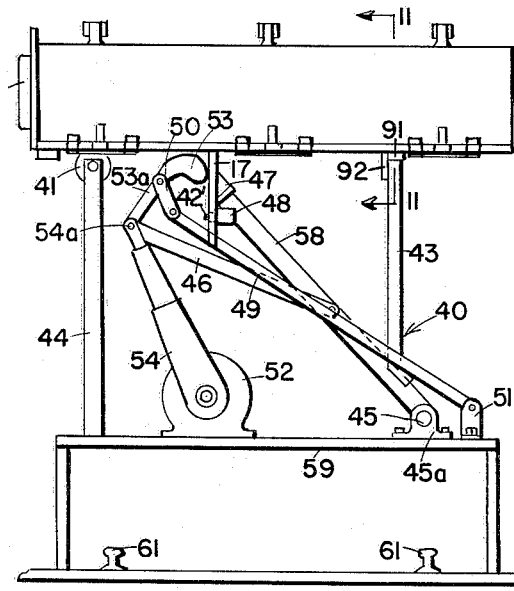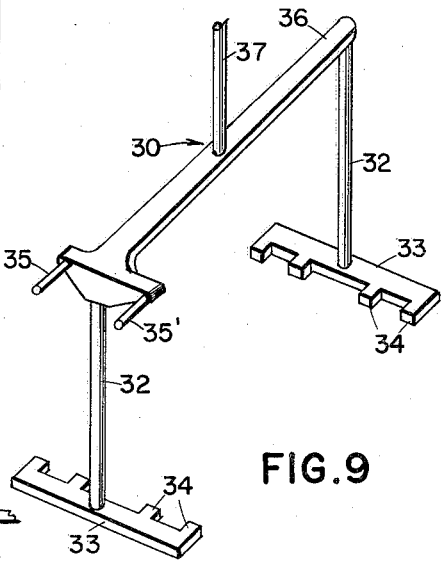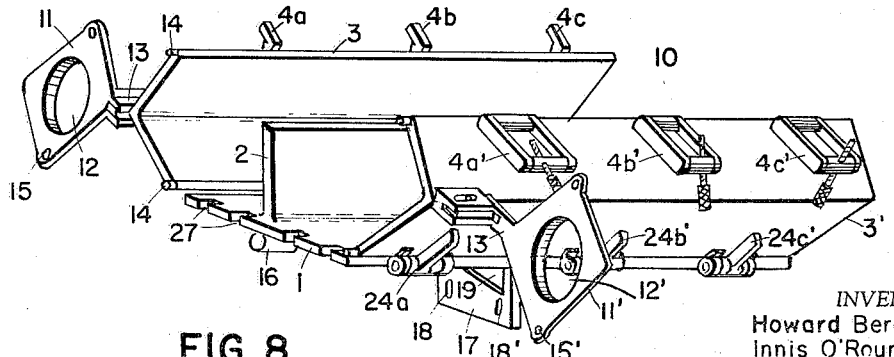

Dec. 26, 1961  H. S. BERGESEN ET AL  3,014,598
MOLD POSITIONER FOR CONCRETE-MOLDING PLANT
Filed May 20, 1958  3 Sheets-Sheet 3

INVENTORS:
Howard Bergesen
Innis O'Rourke, Jr.
BY
AGENT.

3,014,598
MOLD POSITIONER FOR CONCRETE-MOLDING
PLANT
Howard S. Bergesen, Valley Stream, and Innis O'Rourke,
Jr., Upper Brookville, N.Y., assignors to Concrete Conduit Corporation, Corona, N.Y., a corporation of New
York
Filed May 20, 1958, Ser. No. 736,487
6 Claims. (Cl. 214—1)

Our present invention relates to a plant for molding concrete bodies, particularly (but not exclusively) sections of pipe adapted to be placed alongside one another to form a continuous conduit.

In the mass production of concrete pipe sections or other bodies, in which a wet mixture of sand and cement is shaped and compacted within a mold and then removed therefrom for curing in a kiln or on the air, it is desirable that the empty mold be quickly and accurately positioned to receive the concrete charge and the shaping die or dies, that the compacting and shaping operations be carried out fully automatically to insure the necessary uniformity, and that the mold containing the concrete body be removed as rapidly as possible without being subjected to any major shocks which could change the shape of the still poorly coherent mass. Heretofore, these desiderata have been realized only to a limited extent.

It is an object of our invention to provide means for carrying out the above operations in a more satisfactory manner and with a minimum of dependence upon manual labor.

A further object of the invention is the provision of conveniently operable means for delivering an empty mold to a shaping machine and picking up the mold after the machine has completed its function.

An important feature of our invention resides in the provision, as an accessory to a molding machine as described in our copending application Ser. No. 829,387, filed 24 July 1959, of a mold positioner for rapidly and easily depositing an empty mold on an operating base, which advantageously may be in the form of a turntable, and removing it therefrom after the filling and shaping process has been completed.

Yet a further feature of the invention is the provision of a multiple mold and the adaptation of both the shaping machine and the mold positioner to handle this type of mold.

The above and other objects, features and advantages of our invention will become more readily apparent from the following detailed description of a preferred embodiment, reference being had to the acompanying drawing in which:

FIG. 5 is a sectional view taken on the line 5—5 of FIG. 2;

FIG. 6 is an end view taken on the line 6—6 of FIG. 2;

FIG. 7 is an elevational view showing the mold of FIGS. 2–6 horizontally supported on a mold positioner forming part of the plant of FIG. 1;

FIG. 8 is a perspective view of the mold in open position;

FIG. 9 is a perspective view illustrating a boom for lifting the shaped concrete bodies from the mold;

Figure 1:
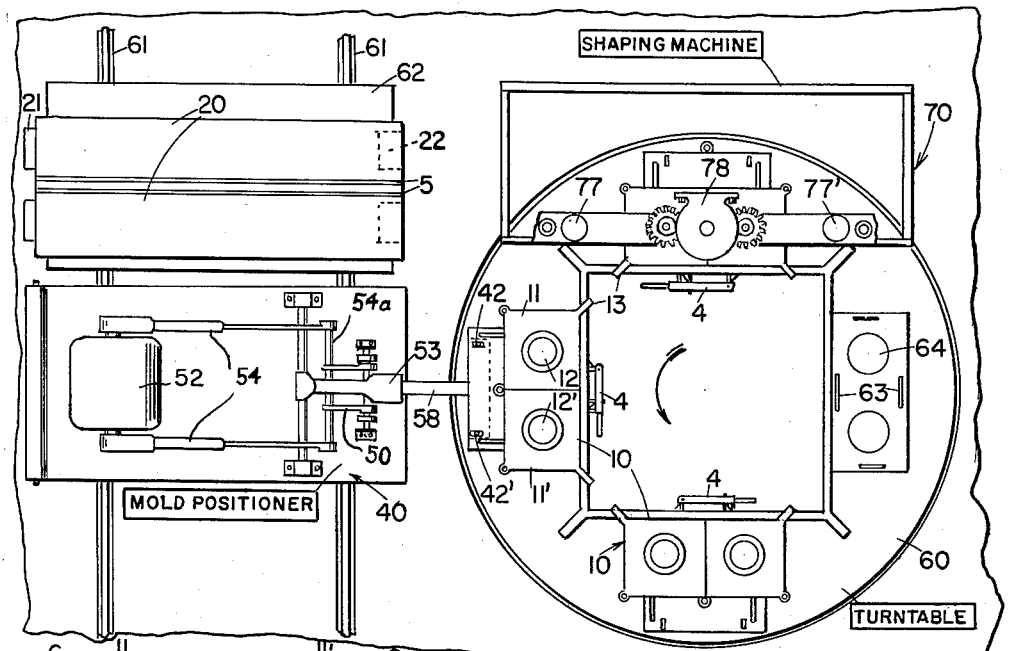
FIG. 1 is a somewhat diagrammatic top plan view of a plant according to the invention, showing the overall organization of its principal parts.

*General description of the plant (FIG. 1)*

The principal parts of a plant according to our invention are the mold positioner 40, the shaping machine 70, and a turntable 60 adapted to transport a number of molds 10 from the positioner 40 to the machine 70 and vice versa. Advantageously, rails 61 are provided in the immediate vicinity of the mold positioner 40 over which the shaped concrete bodies 20 can be transported to a drying station (not shown) by means of flat cars 62.

Turntable 60 has four mold-receving posts, spaced 90° apart, which can be successively rotated past the shaping machine 70 and the mold positioner 40 by suitable manual or automatic means not shown. Since the turntable receives empty molds from the mold positioner 40 and delivers them to the shaping machine 70, at the same time transporting filled molds from the machine back to the positioner, it is desirable that the latter be located immediately downstream from the shaping machine so that the processing of the filled molds may not be delayed if the shaping operation must be interrupted for any reason. Thus, mold positioner 40 is shown displaced by 90° from the shaping machine 70 in counterclockwise direction, this being the direction of rotation of turntable 60 as indicated by the arrow.

The task of the mold positioner 40 is to deposit the empty mold 10 vertically on the turntable 60, between lugs 63 provided thereon for that purpose, and to pick up the filled molds as they come from the machine 70 whose operation is fully described in our above-mentioned copending application and need not be explained in detail for understanding of the present invention. In this pick-up operation the device 40 swings the molds into a horizontal postion, at a certain elevation above the ground, and holds them so that the molds may be opened and their contents transferred to a waiting flat car 62. In the particular embodiment illustrated, each mold 10 has two identical, parallel chambers which, in the vertical mold position, are closed at the top by respective covers 11, 11' having apertures 12, 12'. The apertures 12, 12' serve to admit raw concrete into the mold chamber, to allow the introduction of respective packing heads designed to compact the concrete therein and to form a longitudinal channel within the concrete body, and to define the shape of a male termination or projection 21 on the pipe section 20 thus formed; a complementary female termination of recess 22 is simultaneously formed by the introduction of so-called groove packers into the mold from below, through openings 64 provided for this purpose at each mold-receiving post of the turntable 60.

*The mold (FIGS. 2–12)*

Each of the molds 10 is provided with a bottom plate 1 from which rises centrally a rib 2 serving as a partition between the two mold chambers. Two L-beam sections 3 and 3' are swingably secured to the longitudinal edges of the rectangular plate 1, on opposite sides of partition 2, by means of hinges 23a, 23b, 23c and 23a', 23b', 23c', respectively. Lugs 24a, 24b, 24c and 24a', 24b', 24c' are fixedly secured to the respective hinge pintles so as to be rigid with the plate 1, thereby forming back stops limiting the outward swing of mold walls 3 and 3' as best seen in FIG. 8.

Figure 11:
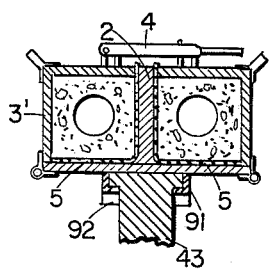
FIG. 11 is a fragmentary sectional view taken on the line 11—11 of FIG. 7, showing two shaped pipe sections within the mold chambers.

To close the mold, wall section 3 is provided with three upstanding lugs 4a, 4b, 4c engageable by respective brackets 4a', 4b', 4c' swingably mounted on wall section 3'. Each of the locking devices 4a, 4a' etc. further comprises a bolt 26, provided with a knurled handle, which traverses the bracket 4 (FIG. 4) and can be screwed into firm contact with the lug 4' when the sections 3, 3' are brought together against the partition 2. Generally, however, the wall sections 3 and 3' will bear upon partition 2 not directly but through the intermediary of sheet-metal strips 5, 5' of L-shaped cross-section placed against this partition and the bottom plate 1, as best seen in FIGS. 5 and 11. Strips 5 and 5' overlie marginal indentations 27 which are provided along the minor side of the plate 1 so as to enable these strips, and the molded bodies positioned thereon, to be lifted out of the mold 10 by a suitable tool such as the boom 30 illustrated in FIG. 9. This boom comprises a carrying handle 37 on a horizontal bar 36 which is provided with finger grips 35, 35'; two rods 32 depend from opposite ends of the bar 36 and terminate in heads 33 having teeth 34 which just fit into the indentations 27 of plate 1 when the boom is placed to straddle the mold 10 longitudinally between its rods 32.

Figures 2, 3, 4:
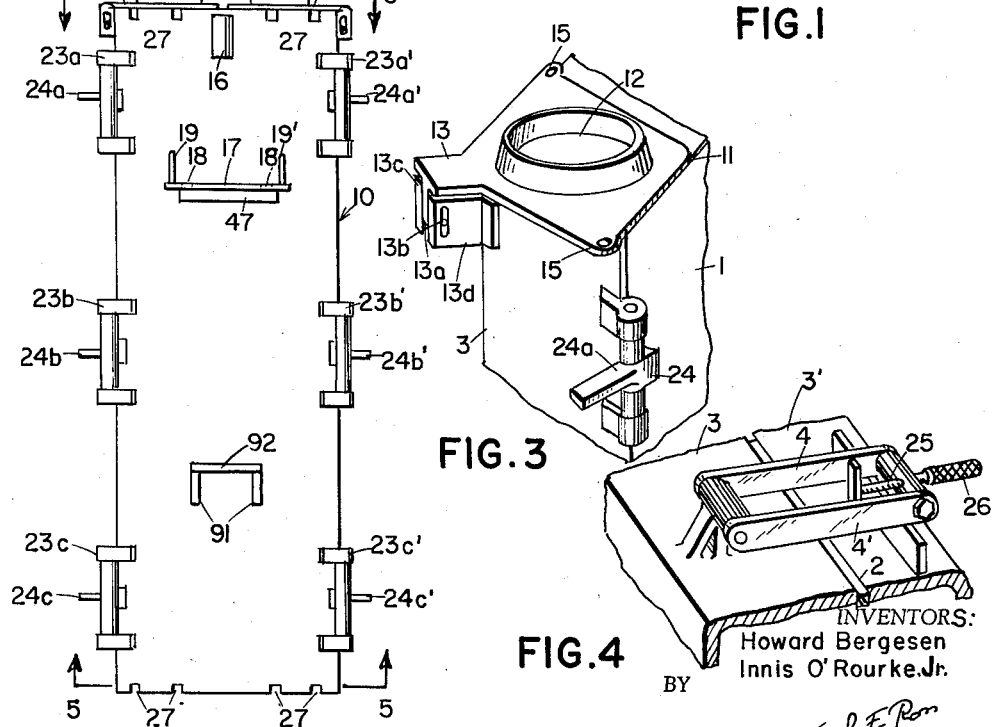
FIG. 2 shows, in bottom view, one of several dual molds forming part of the equipment shown in FIG. 1.
FIG. 3 is a perspective view of part of one of the mold halves.
FIG. 4 shows, in perspective and on a larger scale, one of several locking devices for the mold.
Figure 10:
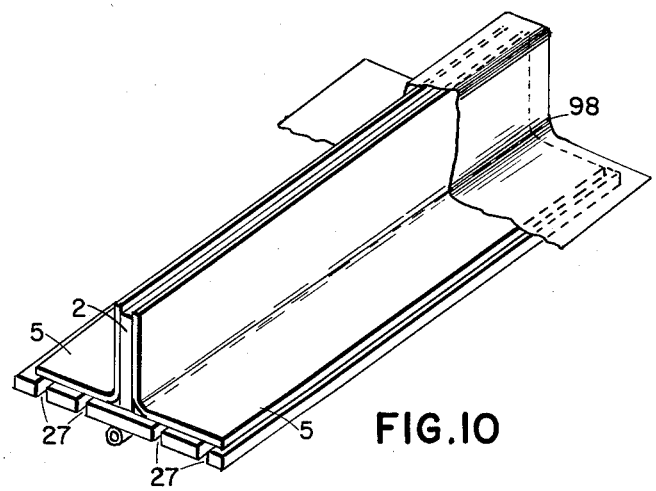
FIG. 10 is a perspective view of a pair of L-shaped liners resting on the bottom of the mold whose movable side plates have been omitted.

The covers 11, 11' are linked at one end of the mold to the sections 3 and 3', respectively, by means of wings 13, 13' forming part of a hinge assembly best illustrated in FIG. 3. The hinge assembly includes a pair of lugs 13c, 13d, projecting outwardly from section 3, which straddle a shank extending from wing 13 and are provided with slots 13a receiving a pin 13b on that shank. By virtue of its arrangement it is possible to swing the covers 11, 11' outwardly and also to give them a limited axial motion whereby a pair of diagonally opposite pins 14, 14' on each section 3, 3' can be fitted into holes on lugs 15, 15' formed at corresponding corners of the two covers.

Figure 12:
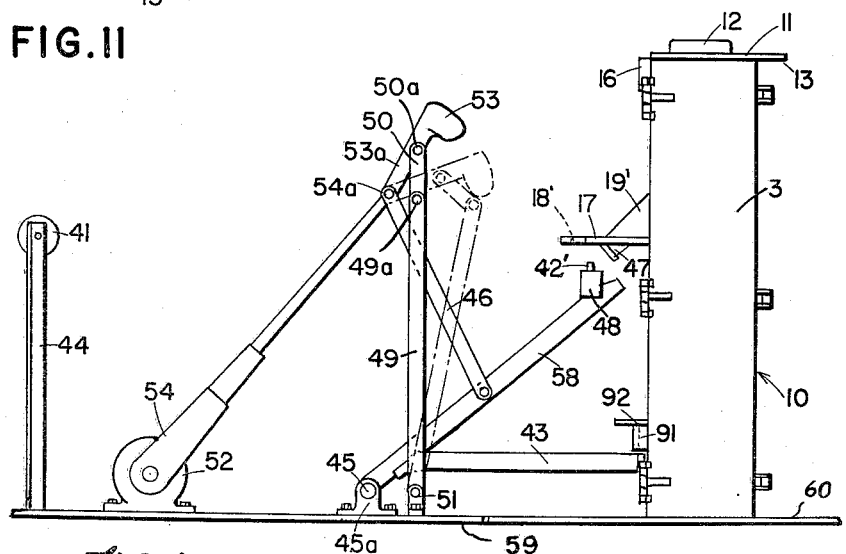
FIG. 12 is a view similar to FIG. 7 but showing the mold in a vertical stance adjacent to the mold positioner.

On its underside, bottom plate 1 is provided with a depending fin 17 which is braced by triangular ribs 19, 19' and provided with a pair of horizontally spaced slots 18, 18'. At its rear, i.e. at its side averted from the covers 11 and 11', the fin 17 carries a horizontal ridge 47 enclosing with it an angle of approximately 45° as best seen in FIG. 12. A pair of short rails 91, connected by a stop plate 92, also project from the underside of the mold at a location remote from the covers 11 and 11'. Finally, a short tube 16 extends near the forward edge of plate 1 in alignment with partition 2.

*The mold positioner (FIGS. 7 and 12)*

The device 40, which supports the mold 10 when it does not rest on the turntable 60, comprises a base 59 carrying a hydraulic motor 52. This motor has two telescoped operating arms 54 (see also FIG. 1) extensibly and rotatably connected, via a pin 54a, with a lever 53a and a pair of arms 46; these arms are pivotally joined to a bar 58 which is swingably mounted on the base 59 by means of a shaft 45 passing through bearings 45a. A pair of brackets 51 on base 59 pivotally support two arms 49 whose other extremities are joined through short links 50 with lever 53a. The links 50 are connected to lever 53a by a pin 50a and joined to the arms 49 by a pin 49a. The mold positioner further comprises a cam-shaped head 53 on the free end of lever 53a, a roller 41 horizontally supported, by means of standards 44 rising from base 59, at a level just above that of cam 53 when the latter is retracted to its lowest position as shown in FIG. 7, and a stem 43 rigidly secured to bar 58 at an acute angle such that this stem rises vertical to the level of roller 41 when the parts are in the position shown in FIG. 7. Stem 43 has a T-shaped head (see FIG. 11) mating with the rails 91 on mold 10; the free end of bar 58 carries a transverse block 48 having two horizontally spaced studs 42, 42' (see also FIG. 1) adapted to pass through the slots 18, 18' on mold fin 17.

As illustrated in FIG. 7, the mold positioner 40 is so constructed that the mold 10 can be horizontally supported thereon by the roller 41 and the stem 43, the latter entering the rails 91 and abutting the plate 92 even as the studs 42, 42' on block 48 pass through the slots 18, 18' of fin 17. At the same time the bar 58 bears upon ridge 47 while cam 53 presses upon the fin 17 from the opposite side. Upon clockwise rotation of the telescoped arms 54, the mold 10 is gently swung around and deposited upon turntable 60 as cam 53, having helped to lift the mold off roller 41, moves toward its highest position, bar 58 releases the fin 17 and stem 43 becomes disengaged from the rails 91. This is illustrated in FIG. 12 which also shows in dot-dash lines that the lever 53a can swing limitedly in the direction of mold 10, until the face of cam 53 rests against the pin 50a. When it is desired to lift the filled mold from the turntable, the motor 52 is operated to swing the arms 54 counterclockwise whereby the operation of the mold positioner is reversed and the mold 10 is brought back to the position illustrated in FIG. 7 while the cam 53 minimizes the impact of this operation upon the mold. The hydraulic motor 52 may be controlled by suitable, preferably foot-operated switches that have not been illustrated.

In the operation of the mold positioner, motor 52 is now operated to pick up the mold 10 and to lift it into its horizontal position illustrated in FIG. 7. Next, the mold is opened, as shown in FIG. 8, and the newly shaped pipe sections 20, 20' supported by L-strips 5, 5' are lifted out with the aid of boom 30 and placed on the flat car 62. Next, other L-strips 5, 5' are inserted into the mold and are covered with a sheet 98 of paper or the like to facilitate the subsequent separation of the concrete bodies from these strips. The mold is then closed and returned to the turntable 60 in the manner previously described.

The invention is, of course, not limited to the specific embodiments described and illustrated but may be modified in various ways without departing from the spirit and scope of the appended claims. Thus, for example, it is possible to provide automatic means known per se for operating the mold-positioner motor 52 in timed relationship with the movements of the turntable.

We claim:

1. A mold positioner adapted to displace an elongated mold between a vertical position and a substantially horizontal position, comprising a base, a first and a second elongated element articulated to said base for swinging movement about respective horizontal axes, each of said elements being provided with a mold-engaging formation at an extremity remote from its respective axis, one of said formations being pivotally connected with the extremity on which it is supported, link means articulatedly interconnecting said elements for rotation in the same sense about said axes, actuating means coupled with one of said elements for simultaneously rotating both of said elements about said axes, and second link means articulatedly interconnecting said base with said one of said formations for guiding the latter toward the other of said formations in a position in which the last-mentioned formation has been swung through an angle of substantially 90° from a normal position, thereby enabling said formations to grip an appendage of said mold between them.

2. A mold positioner adapted to displace an elongated mold between a vertical position and a substantially horizontal position, comprising a base, a support for said mold carried on said base at a fixed elevated level, a first and a second elongated element articulated to said base for swinging movement about respective horizontal axes, each of said elements being provided with a mold-engaging formation at an extremity remote from its respective axis, one of said formations being pivotally connected with the extremity on which it is supported, link means articulatedly interconnecting said elements for rotation in the same sense about said axes, actuating means coupled with one of said elements for simultaneously rotating both of said elements about said axes, and second link means articulatedly interconnecting said base with said one of said formations for guiding the latter toward the other of said formations in a position in which the last-mentioned formation has been swung upwardly through an angle of substantially 90° to the level of said support from a normal position, thereby enabling said formations to grip an appendage of said mold between them.

3. A mold positioner adapted to displace an elongated mold between a vertical position and a substantially horizontal position, comprising a base, an elongated arm having one extremity pivotally secured to said base for swinging movement about a first horizontal axis and provided on its other extremity with an articulated lever of relatively reduced length, said lever terminating in a mold-supporting portion, an elongated bracing element pivotally secured at one end to said base for swinging movement about a second horizontal axis and provided at its other end with a mold-engaging formation displaceable between a lower position and an upper position upon a swinging of said element through an angle of substantially 90°, first link means articulatedly joining said arm to said element, actuating means for concurrently rotating said arm and said element about their respective axes, and second link means articulatedly interconnecting said base with said lever for guiding said mold-supporting portion toward said mold-engaging formation in said upper position thereof, thereby enabling said portion and said formation to grip an appendage of said mold between them.

4. A mold positioner adapted to displace an elongated mold between a vertical position and a substantially horizontal position, comprising a base, a support for said mold carried on said base at a fixed elevated level, an elongated arm having one extremity pivotally secured to said base for swinging movement about a first horizontal axis and provided on its other extremity with an articulated lever of relatively reduced length, said lever terminating in a mold-supporting portion, an elongated bracing element pivotally secured at one end to said base for swinging movement about a second horizontal axis and provided at its other end with a mold-engaging formation displaceable between a lower position and an upper position near the level of said support upon a swinging of said element through an angle of substantially 90°, first link means articulatedly joining said arm to said element, actuating means for concurrently rotating said arm and said element about their respective axes, and a second link means articulatedly interconnecting said base with said lever for guiding said mold-supporting portion toward said mold-engaging formation in said upper position thereof, thereby enabling said portion and said formation to grip an appendage of said mold between them.

5. A mold positioned adapted to displace an elongated mold between a vertical position and a substantially horizontal position, comprising a base, an extensible arm having one extremity pivotally secured to said base for swinging movement about a first horizontal axis and provided on its other extremity with an articulated lever of relatively reduced length, said lever terminating in a mold-supporting portion, an elongated bracing element pivotally secured at one end to said base for swinging movement about a second horizontal axis and provided at its other end with a mold-engaging formation displaceable between a lower position and an upper position upon a swinging of said element through an angle of substantially 90°, first link means articulatedly joining said arm to said element, actuating means coupled with said arm for concurrently rotating said arm and said element about their respective axes, and second link means articulatedly interconnecting said base with said lever for guiding said mold-supporting portion toward said mold-engaging formation in said upper position thereof, thereby enabling said portion and said formation to grip an appendage of said mold between them, said arm and said first and second link means being so proportioned as to maintain said mold-supporting formation above said elevated level in said lower position of said formation while gradually lowering said formation to said level upon a swinging of said formation into said upper position.

6. A mold positioner adapted to displace an elongated mold between a vertical position and a substantially horizontal position, comprising a base, a support for said mold carried on said base at a fixed elevated level, an extensible arm having one extremity pivotally secured to said base for swinging movement about a first horizontal axis and provided on its other extremity with an articulated lever of relatively reduced length, said lever terminating in a mold-supporting portion, an elongated bracing element pivotally secured at one end to said base for swinging movement about a second horizontal axis and provided at its other end with a mold-engaging formation displaceable between a lower position and an upper position near the level of said support upon a swinging of said element through an angle of substantially 90°, first link means articulatedly joining said arm to said element, actuating means coupled with said arm for concurrently rotating said arm and said element about their respective axes, and second link means articulatedly interconnecting said base with said lever for guiding said mold-supporting portion toward said mold-engaging formation in said upper position thereof, thereby enabling said portion and said formation to grip an appendage of said mold between them, said arm and said first and second link means being so proportioned as to maintain said mold-supporting formation above said elevated level in said lower position of said formation while gradually lowering said formation to said level upon a swinging of said formation into said upper position.

References Cited in the file of this patent

UNITED STATES PATENTS

| Number | Name | Date |
|---|---|---|
| 823,457 | Wilson | June 12, 1906 |
| 946,606 | Leonard | Jan. 18, 1910 |
| 1,316,410 | Barnes | Sept. 16, 1919 |
| 1,361,985 | Hague | Dec. 14, 1920 |
| 1,657,011 | Jolsin | Jan. 24, 1928 |
| 1,778,003 | Tuerck | Oct. 7, 1930 |
| 1,900,569 | Lederer | Mar. 7, 1933 |
| 1,945,426 | Evoy | Jan. 30, 1934 |
| 2,143,449 | O'Rourke | Jan. 10, 1939 |
| 2,180,641 | Milton | Nov. 21, 1939 |
| 2,530,687 | Dixon | Nov. 21, 1950 |
| 2,716,265 | Webb | Aug. 30, 1955 |
| 2,786,254 | Olson | Mar. 26, 1957 |
| 2,787,041 | Pettipiece | Apr. 2, 1957 |

FOREIGN PATENTS

| Number | Country | Date |
|---|---|---|
| 231,644 | Great Britain | Apr. 9, 1925 |
| 504,884 | France | Apr. 24, 1920 |
| 517,712 | Germany | Feb. 7, 1931 |
| 724,269 | Great Britain | Feb. 16, 1955 |
| 1,062,188 | France | Dec. 2, 1953 |